(12) United States Patent
Mitchell

(10) Patent No.: US 8,656,728 B2
(45) Date of Patent: Feb. 25, 2014

(54) WATER FILTER WITH PERFORMANCE INDICATING DEVICE AND REFRIGERATION APPLIANCE INCLUDING SAME

(75) Inventor: Alan Joseph Mitchell, Louisville, KY (US)

(73) Assignee: General Electric Company, Schenectady, NY (US)

( * ) Notice: Subject to any disclaimer, the term of this patent is extended or adjusted under 35 U.S.C. 154(b) by 493 days.

(21) Appl. No.: 12/909,410

(22) Filed: Oct. 21, 2010

(65) Prior Publication Data

US 2012/0096892 A1   Apr. 26, 2012

(51) Int. Cl.
*F25D 3/02* (2006.01)
*F25B 47/00* (2006.01)
*F25B 49/00* (2006.01)
*F25D 3/00* (2006.01)
*B01D 35/00* (2006.01)
*B01D 21/30* (2006.01)

(52) U.S. Cl.
USPC ........ 62/318; 62/85; 62/125; 62/157; 62/158; 62/389; 210/85; 210/87; 210/138

(58) Field of Classification Search
USPC ........ 62/85, 125, 318, 157, 158, 389; 210/85, 210/87, 138
See application file for complete search history.

(56) References Cited

U.S. PATENT DOCUMENTS

| | | | |
|---|---|---|---|
| 5,711,160 A * | 1/1998 | Namisniak et al. | 62/125 |
| 5,907,958 A * | 6/1999 | Coates et al. | 62/338 |
| 2004/0173517 A1* | 9/2004 | Yuan | 210/416.1 |
| 2007/0209978 A1* | 9/2007 | Mitchell | 210/94 |
| 2008/0156015 A1* | 7/2008 | Meyerholtz et al. | 62/318 |
| 2008/0163641 A1* | 7/2008 | Mitchell | 62/389 |
| 2010/0065525 A1* | 3/2010 | Poupore et al. | 215/228 |
| 2011/0226679 A1* | 9/2011 | Lackey et al. | 210/85 |

* cited by examiner

*Primary Examiner* — Mohammad M Ali
*Assistant Examiner* — Erik Mendoza-Wilkenfel
(74) *Attorney, Agent, or Firm* — Dority & Manning, P.A.

(57) ABSTRACT

An assembly for filtering water includes a housing and a water inlet for supplying unfiltered water to the housing. A water filter includes an outer casing attached to the housing in communication with the water inlet and a filter medium within the outer casing. The outer casing has at least one portion that is at least partially translucent. The water filter filters the unfiltered water through filter medium to provide filtered water. A water outlet is attached to the housing for transferring filtered water from the outer casing to a device via the housing. An illumination device is mounted adjacent to the outer casing for selectively illuminating the portion of the outer casing that is at least partially translucent. Related refrigeration appliances incorporating such devices are also disclosed.

20 Claims, 5 Drawing Sheets

WATER FILTER WITH PERFORMANCE INDICATING DEVICE AND REFRIGERATION APPLIANCE INCLUDING SAME

FIELD OF THE INVENTION

The subject matter disclosed herein relates generally to performance indicating devices for water filters, such as those used in refrigeration appliances.

BACKGROUND OF THE INVENTION

Refrigeration appliances that have water or ice dispensers generally include a filter to remove impurities from the water supply before entering the refrigeration appliance equipment. Unfiltered water from a premises water source is typically fed via a filter inlet into a filter within the refrigeration appliance cabinet. The water is filtered within the filter and passed out of a filter outlet to whatever device is provided, such as an ice maker or a water dispenser.

As with most any such filtration system, as filtered particles are captured by the filter medium for a period of time, the filter should be cleaned and/or changed out. This period of time may vary dependent on the characteristics of the water provided based on the local water or treatment type, whether municipal or well water is employed, etc. In any event, periodically, the filter in such a refrigeration system should receive some attention from a user to maintain optimal performance.

Indicators have been provided to refrigeration appliance users in the form of lights on a front door panel of the refrigeration appliance. In such case, a light may be illuminated next to a textual indicator such as "Filter" to remind the user to check the filter periodically. Also, LCD displays on the front door panels have also been employed providing such a textual reminder.

However, with such a front door location, a user may simply press a reset button, ignore the light or message, or not remember where the instruction manual says the filter is located. In particular, with many filters located inside of the cabinet of the refrigeration appliances, the user may never even look at the filter when the light on the door is illuminated. Even if the indicator light is on an interior of the cabinet on a refrigeration control panel or the like, the same issues may apply if a user does not know where to look within the cabinet for the filter. Accordingly, the filter may not always be serviced as frequently as the manufacturer has recommended in spite of the indication provided to the user. Such issues also apply to filters used in other locations, such as whole-house filters, under-sink filters, etc., perhaps even more so when such filters are in hard to reach spaces. Therefore, an improved performance indication device for a filter assembly would be welcome.

BRIEF DESCRIPTION OF THE INVENTION

Aspects and advantages of the invention will be set forth in part in the following description, or may be obvious from the description, or may be learned through practice of the invention.

According to certain aspects of the disclosure, an assembly for filtering water includes a housing and a water inlet for supplying unfiltered water to the housing. A water filter includes an outer casing attached to the housing in communication with the water inlet and a filter medium within the outer casing. The outer casing has at least one portion that is at least partially translucent. The water filter filters the unfiltered water through filter medium to provide filtered water. A water outlet is attached to the housing for transferring filtered water from the outer casing to a device via the housing. An illumination device is mounted adjacent to the outer casing for selectively illuminating the portion of the outer casing that is at least partially translucent. Various options and modifications are possible.

According to certain other aspects of the disclosure, an assembly for filtering water includes a housing and a water inlet for supplying unfiltered water to the housing. A water filter includes an outer casing attached to the housing in communication with the water inlet and a filter medium within the outer casing. The outer casing is substantially translucent. The water filter filters the unfiltered water through filter medium to provide filtered water. A water outlet is attached to the housing for transferring filtered water from the outer casing to a device via the housing. An illumination device is mounted adjacent the outer casing for selectively illuminating the outer casing. A controller selectively illuminates the illumination device dependent upon a level of a usage factor. As above, various options and modifications are possible.

A refrigeration appliance includes a refrigerated compartment having a door and a housing mounted within the refrigerated compartment. A water inlet supplies unfiltered water to the housing. A water filter includes an outer casing attached to the housing in communication with the water inlet and a filter medium within the outer casing. The outer casing has at least one portion that is at least partially translucent. The water filter filters the unfiltered water through filter medium to provide filtered water. A water outlet is attached to the housing for transferring filtered water from the outer casing to a device via the housing. An illumination device is mounted within the refrigerated compartment for selectively illuminating the portion of the outer casing that is at least partially translucent so that it is visible from outside of the refrigerated compartment when the door is open. As above, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
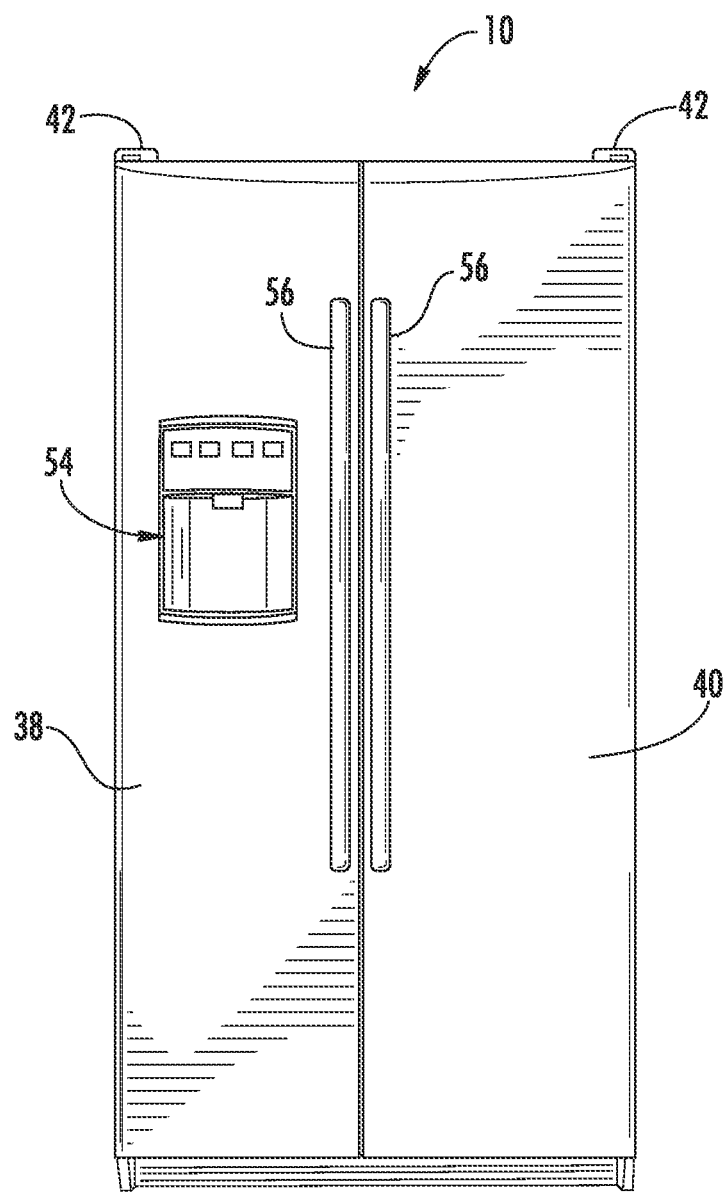
FIG. 1 provides a front view of a refrigeration appliance with its doors closed.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary refrigeration appliance 10 depicted as a refrigerator in which filter performance indicating assemblies in accordance with aspects of the present invention may be utilized. It should be appreciated that the appliance of FIG. 1 is for illustrative purposes only and that the present invention is not limited to any particular type, style, or configuration of refrigeration appliance, and that such appliance may include any manner of refrigerator, freezer, refrigerator/freezer combination, and so forth.

Figure 2:
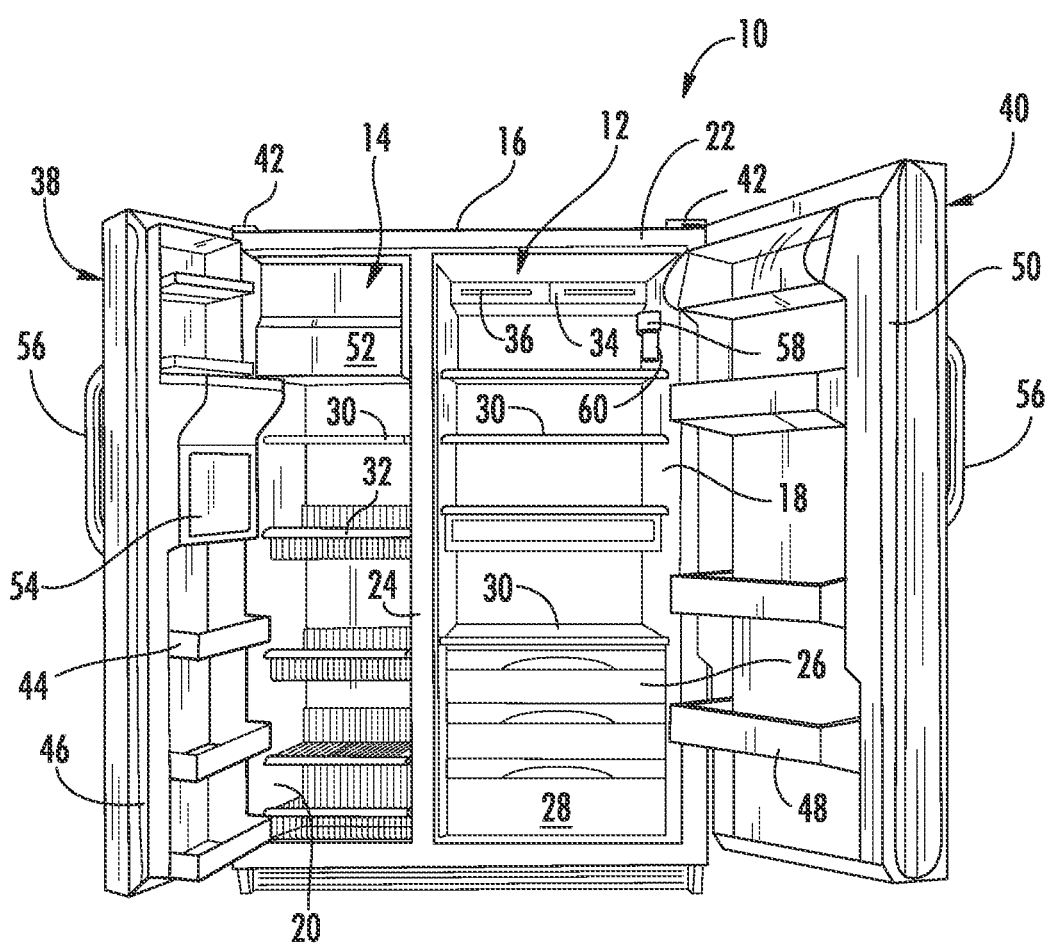
FIG. 2 provides a front view of the refrigeration appliance of FIG. 1 with its doors opened.

Referring to FIG. 2, the refrigerator 10 includes a fresh food storage compartment 12 and a freezer storage compartment 14, with the compartments arranged side-by-side and contained within an outer case 16 and inner liners 18 and 20 generally molded from a suitable plastic material. In smaller refrigerators 10, a single liner is formed and a mullion spans between opposite sides of the liner to divide it into a freezer storage compartment and a fresh food storage compartment. The outer case 16 is normally formed by folding a sheet of a suitable material, such as pre-painted steel, into an inverted U-shape to form top and side walls of the outer case 16. A bottom wall of the outer case 16 normally is formed separately and attached to the case side walls and to a bottom frame that provides support for refrigerator 10.

A breaker strip 22 extends between a case front flange and outer front edges of inner liners 18 and 20. The breaker strip 22 is formed from a suitable resilient material, such as an extruded acrylo-butadiene-styrene based material (commonly referred to as ABS). The insulation in the space between inner liners 18 and 20 is covered by another strip of suitable resilient material, which also commonly is referred to as a mullion 24 and may be formed of an extruded ABS material. Breaker strip 22 and mullion 24 form a front face, and extend completely around inner peripheral edges of the outer case 16 and vertically between inner liners 18 and 20.

Slide-out drawers 26, a storage bin 28 and shelves 30 are normally provided in fresh food storage compartment 12 to support items being stored therein. In addition, at least one shelf 30 and at least one wire basket 32 are also provided in freezer storage compartment 14.

The refrigerator features are controlled by a controller 34 according to user preference via manipulation of a control interface 36 mounted in an upper region of fresh food storage compartment 12 and coupled to the controller 34. As used herein, the term "controller" is not limited to just those integrated circuits referred to in the art as microprocessor, but broadly refers to computers, processors, microcontrollers, microcomputers, programmable logic controllers, application specific integrated circuits, and other programmable circuits, and these terms are used interchangeably herein.

A freezer door 38 and a fresh food door 40 close access openings to freezer storage compartment 14 and fresh food storage compartment 12. Each door 38, 40 is mounted by a top hinge 42 and a bottom hinge (not shown) to rotate about its outer vertical edge between an open position, as shown in FIG. 1, and a closed position. The freezer door 38 may include a plurality of storage shelves 44 and a sealing gasket 46, and fresh food door 40 also includes a plurality of storage shelves 48 and a sealing gasket 50.

The freezer storage compartment 14 may include an automatic ice maker 52 and a dispenser 54 provided in the freezer door 38 such that ice and/or chilled water can be dispensed without opening the freezer door 38, as is well known in the art. Doors 38 and 40 may be opened by handles 56 is conventional. A housing 58 may hold a water filter 60 used to filter water for the ice maker 52 and/or dispenser 54.

As with known refrigerators, the refrigerator 10 also includes a machinery compartment (not shown) that at least partially contains components for executing a known vapor compression cycle for cooling air. The components include a compressor, a condenser, an expansion device, and an evaporator connected in series as a loop and charged with a refrigerant. The evaporator is a type of heat exchanger which transfers heat from air passing over the evaporator to the refrigerant flowing through the evaporator, thereby causing the refrigerant to vaporize. The cooled air is used to refrigerate one or more refrigerator or freezer compartments via fans. Also, a cooling loop can be added to direct cool the ice maker to form ice cubes, and a heating loop can be added to help remove ice from the ice maker. Collectively, the vapor compression cycle components in a refrigeration circuit, associated fans, and associated compartments are conventionally referred to as a sealed system. The construction and operation of the sealed system are well known to those skilled in the art.

Figure 3:
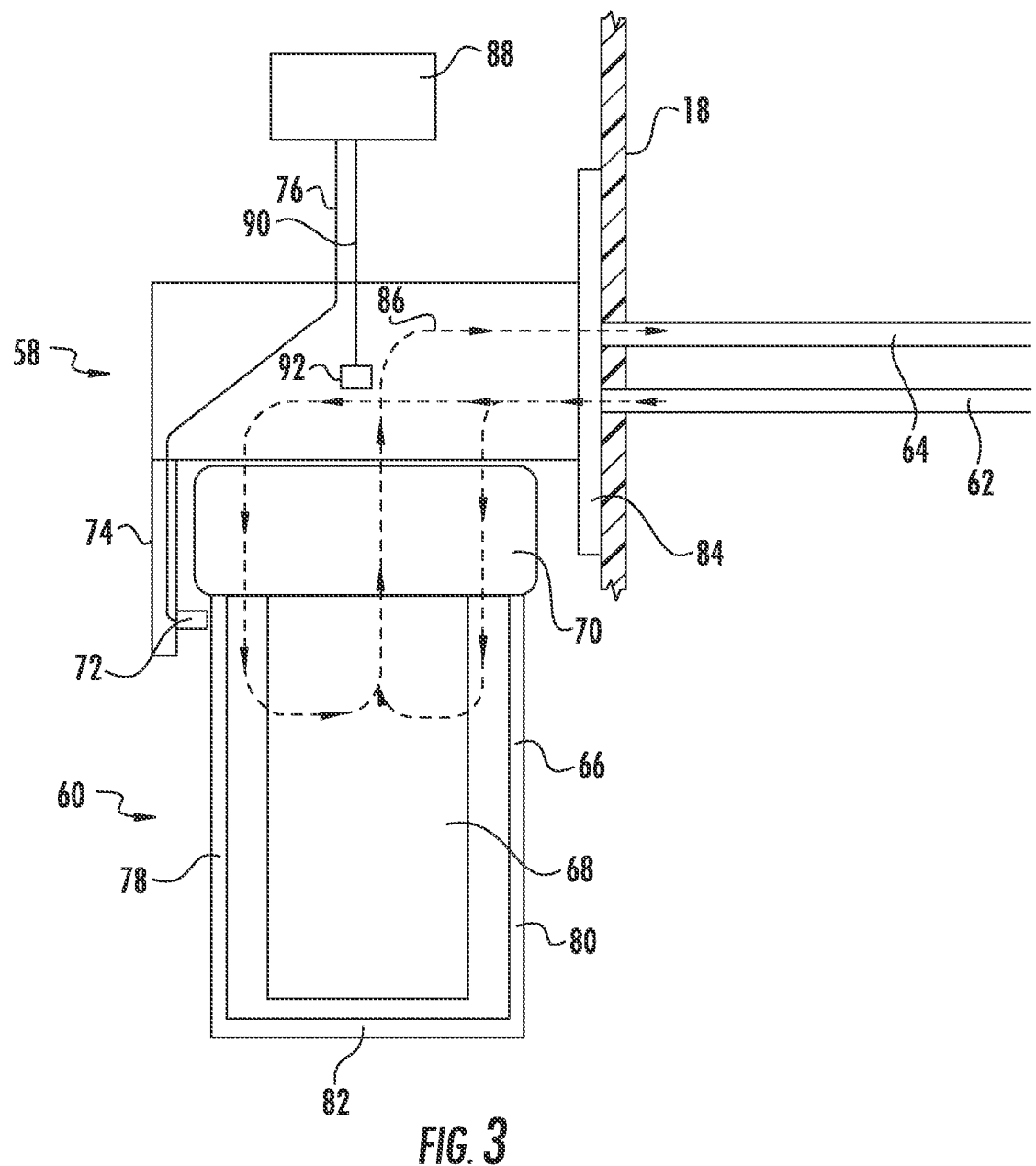
FIG. 3 provides a side partial sectional view of a water filter suitable for use in a refrigeration appliance as in FIG. 1 with an illumination device not illuminated and a full filter outer casing being at least partially translucent.
Figure 4:
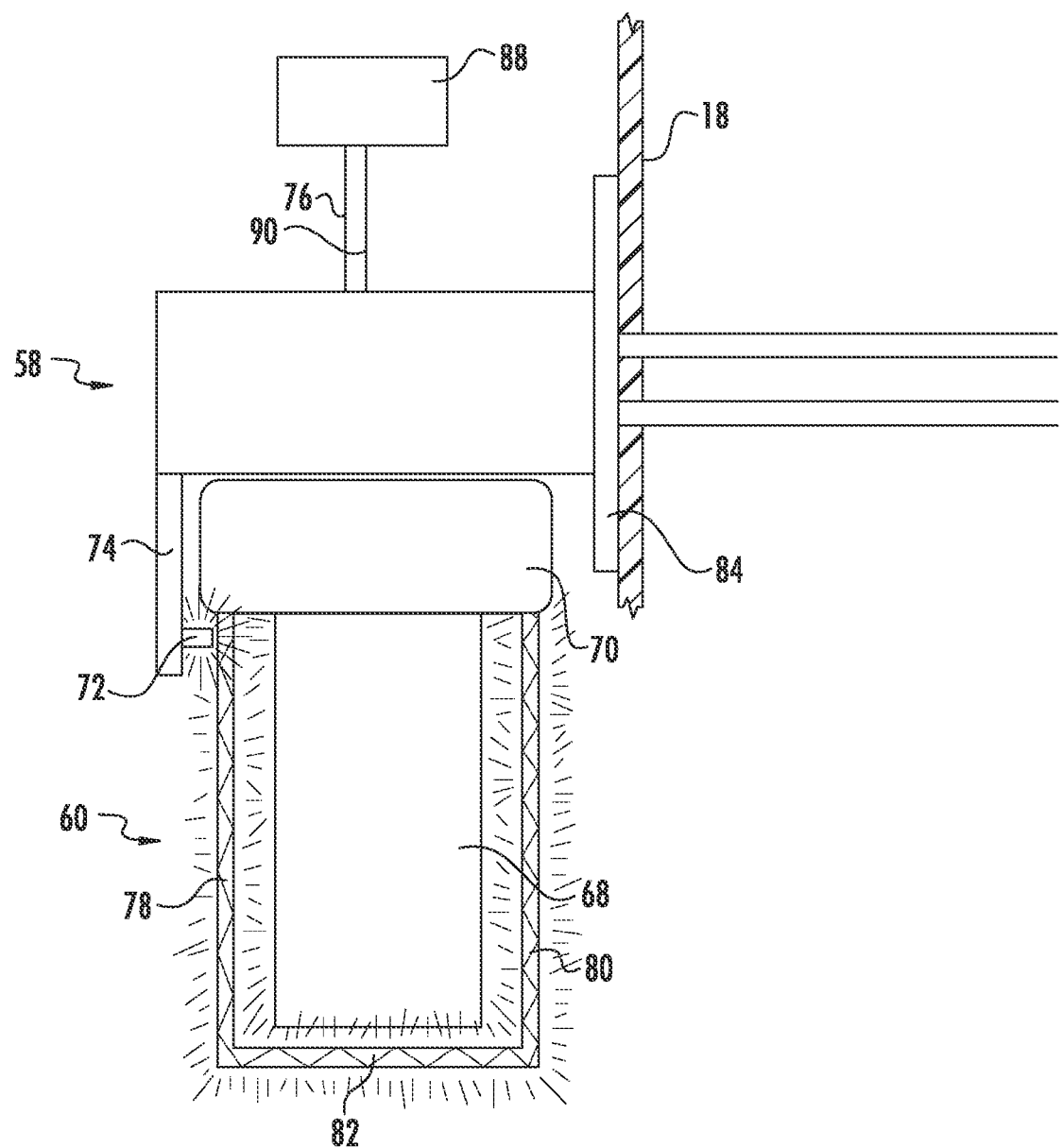
FIG. 4 provides a view of the water filter as in FIG. 3 with the illumination device illuminated.

As shown in FIGS. 3 and 4, a water filtering assembly may include a housing 58 attached to refrigeration appliance inner wall 18 via flange 84 and a water filter 60. however, it should be kept in mind that wall 18 could comprise any wall, whether in an refrigeration appliance or not, depending on desired application. A water inlet 62 provides unfiltered water to housing 58 and a water outlet 64 removes filtered water from the housing to supply to a water using device, such as ice maker 52 within refrigeration appliance 10 or any other such device if installed elsewhere.

Water filter 60 includes an outer casing 66 and a conventional inner filter medium 68, which may comprise for example one or more of granular media such as activated carbon, membranes, etc., as desired. Outer casing 66 is attached to a conventional water filter cap 70 for attachment of water filter 60 to housing 58. A fluid path 86 is represented in dotted lines from inlet 62, though housing 58 and cap 70 into filter casing 66, though filter medium 68 and back out of casing 66 though cap 70 and housing 58. This path and function is conventional and housing 58 acts as a liquid manifold in the system. The filter may be reusable (i.e., cleanable) or single use, as desired.

At least a portion of outer casing 66 is at least partially translucent, and can be lit by an illumination device 72. Accordingly, the translucent portion could be made of a clear plastic, such as an acrylic suitable for use with water and if desired in a cooled environment such as an interior of a refrigeration appliance. As shown in FIGS. 3 and 4, all of outer casing 66 is made of the at least partially translucent material. The material may be fully translucent or transparent as well. It should be understood that lesser amounts of outer casing 66 could be made of such a material. For example, a ring around the top of outer casing 66 could be made at least partially translucent, as the outer casing and cap 70 may be screwed into housing 58 with threads or a twist lock (not shown). Having the translucent portion extend circumferentially around outer casing 66 ensures that a translucent portion will be facing forward (to the left in FIG. 3) in the direction of the refrigeration appliance door and the user if the filter is mounted on a back wall 18. Similarly, if the filter is mounted on a side wall at least some translucent portion would be facing forward.

Illumination device 72 may comprise an LED, OLED, or any other type of bulb or light source. If desired a lens, prism or other optical transmitting device (not shown) may also be employed. As shown, illumination device 72 is attached to a wall portion 74 of housing 58 adjacent outer casing 66, but the illumination device could be located elsewhere and/or spaced from the outer casing with suitable conventional light transferring materials therebetween. For example, illumination device could be located on inner liner 18 if desired, adjacent outer casing 66. Such location may be preferable to allow electronics and connections to be behind outer casing away from the refrigerated compartment. With illumination device 72 located so that it is not directly visible to a user yet directs light onto outer casing, the illumination device draws attention to the outer casing and filter, and not the illumination device itself.

As shown in FIG. 4, when illumination device 72 is illuminated via electrical connection 76 if outer casing 66 is entirely made of material that is at least partially translucent, then all of the outer casing with be illuminated to some extent by a light pipe type transmission of light from the illumination device. Thus, front 78, back 80 and bottom 82 portions of outer casing 66 will all have some illumination, making the outer casing readily noticeable to a user. It may be desirable to include a thin coating on the inner surface of outer casing 66 that would improve internal reflection, in particular when the outer casing is full of water.

If desired, a controller 88 may be used to selectively illuminate illuminating device 72. Controller 88 may be a separate integrated circuit board with on-board programmed chip(s) or the controller may be within main refrigeration appliance controller 34. Controller 88 may also be in communication 90 with one or more sensors 92. Connections may be wired or wireless if desired.

Controller 88 may cause illumination device 72 to be illuminated in various ways and for various reasons. Several usage factor levels may be employed to determine when to illuminate the device 72.

For example, controller 88 may include or receive input from a clock device, and may light up illumination device 72 after a certain predetermined period of time expires. Therefore, if a filter has a certain duty rating, after a period of time, controller may light the outer casing 66 of the filter to remind the user to change or clean the filter. In such case, sensor 92 could comprise a mechanical, electrical or other sensor that senses when filter cap 70 is installed, and controller 88 can start measuring time from that point.

Alternately, sensor 92 could measure a total flow though either inlet 62 or outlet 64 or other location, and controller 88 can determine a total predetermined amount of water suitable for the filter before change or service. When such amount of water flow past sensor 92 has been detected, the illumination device 72 can be illuminated to indicate to the user that attention is required.

Alternately, sensor 92 could measure flow rate out of outlet 64 or some other location. Accordingly, if filter 60 has become partially clogged to the point that the flow rate is below a predetermined amount, illumination device 72 can be illuminated.

As mentioned above, illumination device 72 could be illuminated in different ways as well. For example, illumination device 72 could be constantly illuminated with white light in a normal state and could be intermittently illuminated when a service needed state is reached. Alternatively, no illumination could be used in a normal state and intermittent illumination could be used in a service needed state. Also, illumination with a color or colors other than white could be used. In such case, white (or a color such as green) could be used for normal operation and another color such as red could be used for a service needed state. Alternatively, a single color such as red could be used with no illumination for a normal state and red constant or intermittent illumination for a needs service state. Also, different colors could be used to indicate different service needs (time passing, cumulative amount of flow, rate of flow, etc.). Accordingly, various combinations and subcombinations of signals using all of these parameters are within the scope of the invention.

Figure 5:
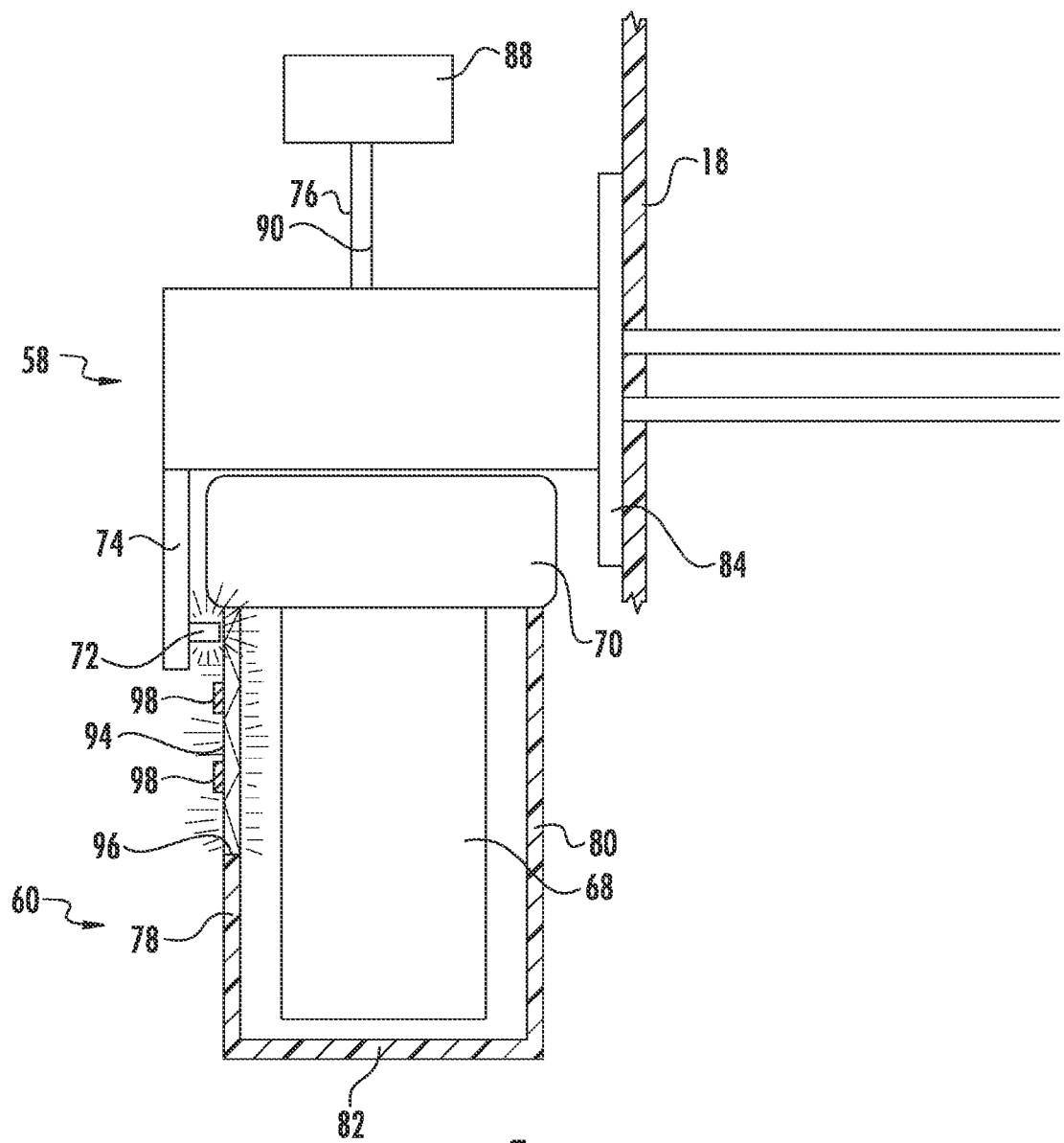
FIG. 5 provides a view of an alternate water filter as in FIG. 3, with only a partial portion of filter outer casing being at least partially translucent and the illumination device illuminated.

FIG. 5 shows a filter system identical to that of FIGS. 3 and 4 except for a modified version of the outer casing 66. In FIG. 5, only a portion 94 of outer casing 66 is at least partially translucent. Border 96 separates the edge of portion 94 from the remainder of outer casing 66. If desired, portion 94 may have various shapes, may have a symbol, may include masking 98, etc., so that a message may be expressly provided to the user, such as "Change," "Service," "Check Filter," etc.

In view of the above, an assembly for filtering water is provided wherein an illumination device may selectively provide the user information as to the state of the filter. It is provided in a logical and accessible location. The system is initiated automatically upon installation of the filter. Various modes and options are possible. Minimal change or addition to existing filter design is required.

It should also be understood that although this disclosure shows a filtration system used in a refrigeration appliance, the invention is not limited to such use. As set forth in the appended claims, the filtration system, the performance indicating device function, the illumination device, at least partially translucent casing, indications, etc., may also be employed on whole-house filters, under sink filters, etc. Therefore, the depiction of the filtration systems and discussion related to refrigeration appliances should not be limiting.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An assembly for filtering water, the assembly comprising:
    a housing having a flange configured for positioning on and mounting to a wall;
    a water inlet for supplying unfiltered water to the housing;
    a water filter positioned below the housing, the water filter including a cylindrical outer casing mounted to the housing and a filter medium disposed within the cylindrical outer casing, the cylindrical outer casing having at least one portion that is at least partially translucent, the at least one portion of the cylindrical outer casing that is at least partially translucent extending circumferentially around the cylindrical outer casing, the water filter filtering the unfiltered water through filter medium to provide filtered water;

a water outlet attached to the housing for transferring filtered water from the cylindrical outer casing to a device via the housing; and an illumination device mounted to the housing or the wall and positioned between the housing or the wall and the cylindrical outer casing, the illumination device configured for selectively illuminating the portion of the cylindrical outer casing that is at least partially translucent.

2. The assembly of claim 1, further including a controller, the illumination device being selectively illuminated by the controller dependent upon a level of a usage factor.

3. The assembly of claim 2, wherein the usage factor is one or more of an amount of time, an amount of water, and a flow rate of water.

4. The assembly of claim 2, wherein the illumination device only illuminates the cylindrical outer casing when the usage factor level reaches a predetermined limit.

5. The assembly of claim 2, wherein the controller places the illumination device in a first state when the usage factor level is not at a predetermined limit and in a second state when the usage factor level reaches the predetermined limit.

6. The assembly of claim 5, wherein the first state includes illumination with a first color and the second state includes illumination with a second color.

7. The assembly of claim 5, wherein the first state includes no illumination and the second state includes illumination.

8. The assembly of claim 7, wherein the second state comprises intermittent illumination.

9. The assembly of claim 5, wherein the first state includes constant illumination and the second state includes intermittent illumination.

10. The assembly of claim 1, wherein the housing is attachable to a refrigeration appliance.

11. The assembly of claim 1, wherein the entire cylindrical outer casing is at least partially translucent.

12. An assembly for filtering water, the assembly comprising:

a housing having a flange configured for positioning on and mounting to a wall;

a water inlet for supplying unfiltered water to the housing;

a water filter positioned below the housing, the water filter including a cylindrical outer casing mounted to the housing and a filter medium disposed within the cylindrical outer casing, the cylindrical outer casing being substantially translucent, the water filter filtering the unfiltered water through filter medium to provide filtered water;

a water outlet attached to the housing for transferring filtered water from the cylindrical outer casing to a device via the housing;

an illumination device mounted to the housing or the wall and positioned between the housing or the wall and the cylindrical outer casing, the illumination device configured for selectively illuminating the cylindrical outer casing; and a controller for selectively illuminating the illumination device dependent upon a level of a usage factor.

13. The assembly of claim 12, wherein the usage factor is one or more of an amount of time, an amount of water, and a flow rate of water.

14. The assembly of claim 12, wherein the illumination device only illuminates the cylindrical outer casing when the usage factor level reaches a predetermined limit.

15. The assembly of claim 12, wherein the controller places the illumination device in a first state when the usage factor level is not at a predetermined limit and in a second state when the usage factor level reaches the predetermined limit.

16. The assembly of claim 15, wherein the first state includes illumination with a first color and the second state includes illumination with a second color.

17. The assembly of claim 15, wherein the first state includes no illumination and the second state includes illumination.

18. A refrigeration appliance comprising:

a refrigerated compartment having a door;

a housing having a flange configured for positioning on and mounting to a wall of the refrigerated compartment;

a water inlet for supplying unfiltered water to the housing;

a water filter positioned below the housing, the water filter including a cylindrical outer casing mounted to the housing and a filter medium disposed within the cylindrical outer casing, the cylindrical outer casing having at least one portion that is at least partially translucent, the at least one portion of the cylindrical outer casing that is at least partially translucent extending circumferentially around the cylindrical outer casing, the water filter filtering the unfiltered water through filter medium to provide filtered water;

a water outlet attached to the housing for transferring filtered water from the cylindrical outer casing to a device via the housing; and an illumination device mounted to the housing or the wall of the refrigeration compartment and positioned between the housing or the wall of the refrigerator appliance and the cylindrical outer casing, the illumination device configured for selectively illuminating the portion of the cylindrical outer casing that is at least partially translucent so that the portion of the cylindrical outer casing that is at least partially translucent is visible from outside of the refrigerated compartment when the door is open.

19. The refrigeration appliance of claim 18, further including a controller, the illumination device being selectively illuminated by the controller dependent upon a level of a usage factor.

20. The refrigeration appliance of claim 19, wherein the usage factor is one or more of an amount of time, an amount of water, and a flow rate of water.

* * * * *